(12) United States Patent
Kao et al.

(10) Patent No.: US 7,102,696 B2
(45) Date of Patent: Sep. 5, 2006

(54) METHOD OF EFFECTING VARIOUS ANTI COMPENSATION PROCESSES ON SEGMENTED GRAY LEVEL OF INPUT IMAGE ON PLASMA DISPLAY PANEL

(75) Inventors: Shiuh-Bin Kao, Taipei (TW);
Liang-Kuei Hsu, Taipei (TW);
Kuang-Lang Chen, Taipei (TW)

(73) Assignee: Chunghwa Tubes, Ltd., Taipei (TW)

( * ) Notice: Subject to any disclaimer, the term of this patent is extended or adjusted under 35 U.S.C. 154(b) by 427 days.

(21) Appl. No.: 09/859,542

(22) Filed: May 18, 2001

(65) Prior Publication Data
US 2002/0176024 A1    Nov. 28, 2002

(30) Foreign Application Priority Data
Apr. 3, 2001    (TW)    ............... 90108030 A

(51) Int. Cl.
H04N 5/57    (2006.01)
H04N 5/202    (2006.01)
G09G 3/28    (2006.01)
G09G 3/36    (2006.01)
G09G 5/02    (2006.01)
G09G 5/10    (2006.01)

(52) U.S. Cl. ............ 348/674; 348/254; 348/687; 345/60; 345/89; 345/590; 345/690

(58) Field of Classification Search ........... 348/671, 348/673–675, 678, 686–687, 613, 254; 345/60, 345/63, 590, 690, 89–90; 358/519; H04N 5/202
See application file for complete search history.

(56) References Cited

U.S. PATENT DOCUMENTS

| | | | | |
|---|---|---|---|---|
| 5,012,163 A | * | 4/1991 | Alcorn et al. | 315/383 |
| 5,398,076 A | * | 3/1995 | Lum et al. | 348/676 |
| 5,546,101 A | * | 8/1996 | Sugawara | 345/63 |
| 5,734,362 A | * | 3/1998 | Eglit | 345/89 |
| 6,034,656 A | * | 3/2000 | Yamamoto et al. | 345/60 |
| 6,137,542 A | * | 10/2000 | Van Mourik | 348/674 |
| 6,304,300 B1 | * | 10/2001 | Warren et al. | 348/674 |
| 6,317,157 B1 | * | 11/2001 | Takayama | 348/441 |
| 6,323,880 B1 | * | 11/2001 | Yamada | 345/690 |
| 6,340,996 B1 | * | 1/2002 | Nakamura | 348/675 |
| 6,344,857 B1 | * | 2/2002 | Matono et al. | 345/600 |
| 6,441,870 B1 | * | 8/2002 | Rapaich | 348/674 |
| 6,462,735 B1 | * | 10/2002 | Naito | 345/204 |
| 6,570,611 B1 | * | 5/2003 | Satou et al. | 348/189 |
| 6,593,934 B1 | * | 7/2003 | Liaw et al. | 345/590 |

(Continued)

Primary Examiner—Brian P. Yenke
(74) Attorney, Agent, or Firm—Jianq Chyun IP Office

(57) ABSTRACT

A process of effecting various anti compensation processes on input image on a plasma display panel comprises the steps of a) performing a gamma (i.e., $\gamma$ equal to 0.45) compensation process on a video signal received by the PDP with respect to a $\gamma$; b) dividing the video signal into at least two segments based on a gray level thereof; and c) performing a variety of anti compensation processes on the video signal in respective segment. A smaller $\gamma$ is used in the anti compensation process with respect to the video signal in a range of low gray level for increasing the gray level in the range of low gray level. Similarly, a larger $\gamma$ is used in the anti compensation process with respect to the video signal in a range of high gray level for increasing a gradient in the range of high gray level, thereby obtaining a sharp image contrast, improving image quality, and rendering an enhanced image brightness.

7 Claims, 7 Drawing Sheets

U.S. PATENT DOCUMENTS

| | | | |
|---|---|---|---|
| 6,603,104 B1 * | 8/2003 | Lee | 250/205 |
| 6,633,343 B1 * | 10/2003 | Ito et al. | 348/674 |
| 6,654,028 B1 * | 11/2003 | Yamakawa | 345/690 |
| 6,674,420 B1 * | 1/2004 | Matsueda et al. | 345/87 |
| 6,727,959 B1 * | 4/2004 | Eskin | 348/674 |
| 6,774,873 B1 * | 8/2004 | Hsu et al. | 345/60 |
| 6,791,576 B1 * | 9/2004 | Lin | 345/690 |
| 6,965,358 B1 * | 11/2005 | Kasahara et al. | 345/63 |
| 2002/0186225 A1 * | 12/2002 | Hsu et al. | 345/606 |

* cited by examiner

METHOD OF EFFECTING VARIOUS ANTI COMPENSATION PROCESSES ON SEGMENTED GRAY LEVEL OF INPUT IMAGE ON PLASMA DISPLAY PANEL

FIELD OF THE INVENTION

The present invention relates to PDPs (plasma display panels) and more particularly to a method of effecting various anti compensation processes on segmented gray level of input image on PDP, thereby significantly improving image quality of PDP.

BACKGROUND OF THE INVENTION

The brightness of a typical color television (TV) may be expressed in following equation (1) in terms of input voltage by utilizing the physical characteristic of cathode ray tube (CRT) of color TV:

$$\text{brightness} = k_1 \times (V_{INPUT}/V_{MAX})^\gamma \quad (1)$$

where $\gamma=2.2$, $k_1$ is a variable representing gray level of color TV (e.g., $k_1=256$ if gray level of color TV is 256), $V_{INPUT}$ is input voltage varied as gray level of color TV, and $V_{MAX}$ is a maximum voltage required for showing a maximum gray level of color TV. Hence, the relationship of input gray level (voltage) versus output brightness of color TV may be plotted as a curve (FIG. 1b). Conventionally, prior to sending a video signal (e.g., NTSC or HDTV), a Gamma ($\gamma$) compensation process (called compensation process hereinafter) is performed on the original video signal by utilizing above physical characteristic thereof. That is, a compensation process is performed with respect to $\gamma$ in equation (1). As such, the relationship of input brightness versus output gray level (voltage) of color TV may be plotted as a curve (FIG. 1a). In one example of $\gamma=0.45$ (i.e., obtained from 1/2.2), the video signal received by color TV is converted into image for showing on screen of CRT of color TV Hence, the relationship of input brightness versus output brightness of color TV may be plotted as a straight line (FIG. 1c). As a result, a high quality image is shown on the typical color TV without distortion.

As to recently available PDPs (plasma display panels) brightness of respective discharge unit on panel thereof is controlled by discharge number.

Hence, brightness may be expressed in following equation (2) in terms of discharge number as below (i.e., a straight line):

$$\text{brightness} = k_2 \times \text{discharge number} \quad (2)$$

where $k_2$ is a variable representing brightness in a discharge number of a pixel of plasma display panel (e.g., $k_2=1$ if brightness of one discharge of PDP is equal to 1 cd/m²) In view of this, the higher discharge number the brighter of PDP. This is similar to the effect that the larger input voltage the brighter of a typical color TV.

Referring to FIGS. 2a, 2b and 2c, a compensation process is performed on received video signal by PDP by substituting $\gamma=0.45$ into equation (1) by similarly utilizing the physical characteristic of typical color TV. As such, the relationship of input brightness versus output gray level (voltage) of PDP may be plotted as a curve (FIG. 2a). Further, the relationship of input gray level (voltage) versus output brightness of PDP may be plotted as a straight line (FIG. 2b). Furthermore, video signal received by PDP is converted into image for showing on screen of PDP Hence, the relationship of input brightness versus output brightness of PDP may be plotted as a curve (FIG. 2c) by similarly substituting $\gamma=0.45$ into equation (1). As a result, a distorted image with poor contrast is shown on PDP.

Typically, an anti compensation process is performed for solving above drawbacks. In detail, in one example, an anti compensation process is performed on received video signal by PDP by substituting $\gamma=2.2$ into equation (1). As such, in PDP the relationship of input gray level (voltage) versus output gray level may be plotted as a curve (FIG. 3b). In another example, an anti compensation process is performed on received video signal by PDP by substituting $\gamma=0.45$ into equation (1). Hence, in PDP the relationship of input brightness versus output gray level (voltage) may be plotted as a curve (FIG. 3a). As to image shown on PDP, the relationship of input gray level (voltage) versus output brightness of PDP may be plotted as a straight line (FIG. 3c). By combining FIGS. 3a, 3b and 3c, in PDP the relationship of input brightness versus output brightness may be plotted as a straight line (FIG. 3d). In other words, a linear relationship exists between image shown on PDP and received video signal. As a result, a high quality image is shown on PDP without distortion.

As to current PDPs, signal input/output and processing are done by a digital technique. Moreover, in most cases gray level of PDP is expressed as a power of 2. For example, in PDP eight bits are needed for representing 256 gray levels. Typically, in performing a compensation process an analog-to-digital conversion is performed on video signal prior to substituting $\gamma=0.45$ into equation (1). Then an anti compensation process is performed by substituting $\gamma=2.2$ into equation (1) for effecting an inverse transform on video signal. Finally, an image is shown on PDP. However, the previous improvement technique has a disadvantage. That is, a non-integer number (e.g., decimal) can not be expressed by a digital signal. Hence, the decimal has to be converted into an integer. In the case of the original video signal having 256 gray levels, the number of gray level is reduced to 184 after first being processed in a analog-to-digital conversion and subsequently by substituting $\gamma=2.2$ into equation (1) for performing an anti compensation process thereafter. In another case that the original video signal having a gray level in the range of 0 to 40, the number of gray level is reduced to 5 (e.g., gray level 0, 1, 2, 3, and 4) after an inverse transform is performed by substituting $\gamma=2.2$ into equation (1) (see Table I below.)

TABLE I

| gray level of original video signal | gray level after $\gamma =$ 2.2 conversion | gray level after $\gamma =$ 2.0 conversion | gray level after $\gamma =$ 1.8 conversion | gray level after $\gamma =$ 1.6 conversion |
| --- | --- | --- | --- | --- |
| 0–20 | 0 | 0–1 | 0–2 | 0–4 |
| 21–28 | 1 | 1–3 | 2–4 | 4–7 |
| 29–33 | 2 | 3–4 | 5–6 | 7–9 |
| 34–38 | 3 | 4–5 | 6–8 | 10–12 |
| 39–42 | 4 | 5–6 | 8–9 | 12–14 |
| 43–46 | 5 | 7–8 | 10–11 | 14–16 |
| . . . | . . . | . . . | . . . | . . . |
| 47–61 | 6–10 | 8–14 | 12–19 | 14–25 |
| Total gray level = 62 | Total gray level = 11 | Total gray level = 15 | Total gray level = 20 | Total gray level = 26 |

Hence, a problem of insufficient gray level of video signal is occurred in the range of low gray level after such anti compensation process. And in turn a false contour is occurred in the range of low gray level. Consequently, a poor contrast is occurred in the range of high gray level due to extremely low gray level (or brightness) gradient. As a result, a difference between two gray levels is undistinguishable visually.

SUMMARY OF THE INVENTION

It is thus an object of the present invention to provide a process of effecting various anti compensation processes on input image on a plasma display panel comprising the steps of a) performing a Gamma (i.e., $\gamma=0.45$) compensation process on a video signal received by the PDP with respect to a $\gamma$; b) dividing the video signal into at least two segments based on a gray level thereof; and c) performing a variety of anti compensation processes on the video signal in respective segment. A smaller $\gamma$ is used in the anti compensation process with respect to the video signal in a range of low gray level for increasing the gray level in the range of low gray level. Similarly, a larger $\gamma$ is used in the anti compensation process with respect to the video signal in a range of high gray level for increasing a gradient in the range of high gray level, thereby obtaining a sharp contrast of image, improving image quality, and rendering an enhanced image brightness.

The above and other objects, features and advantages of the present invention will become apparent from the following detailed description taken with the accompanying drawings.

DETAILED DESCRIPTION OF THE PREFERRED EMBODIMENTS

Figures 1A, 1B, 1C:
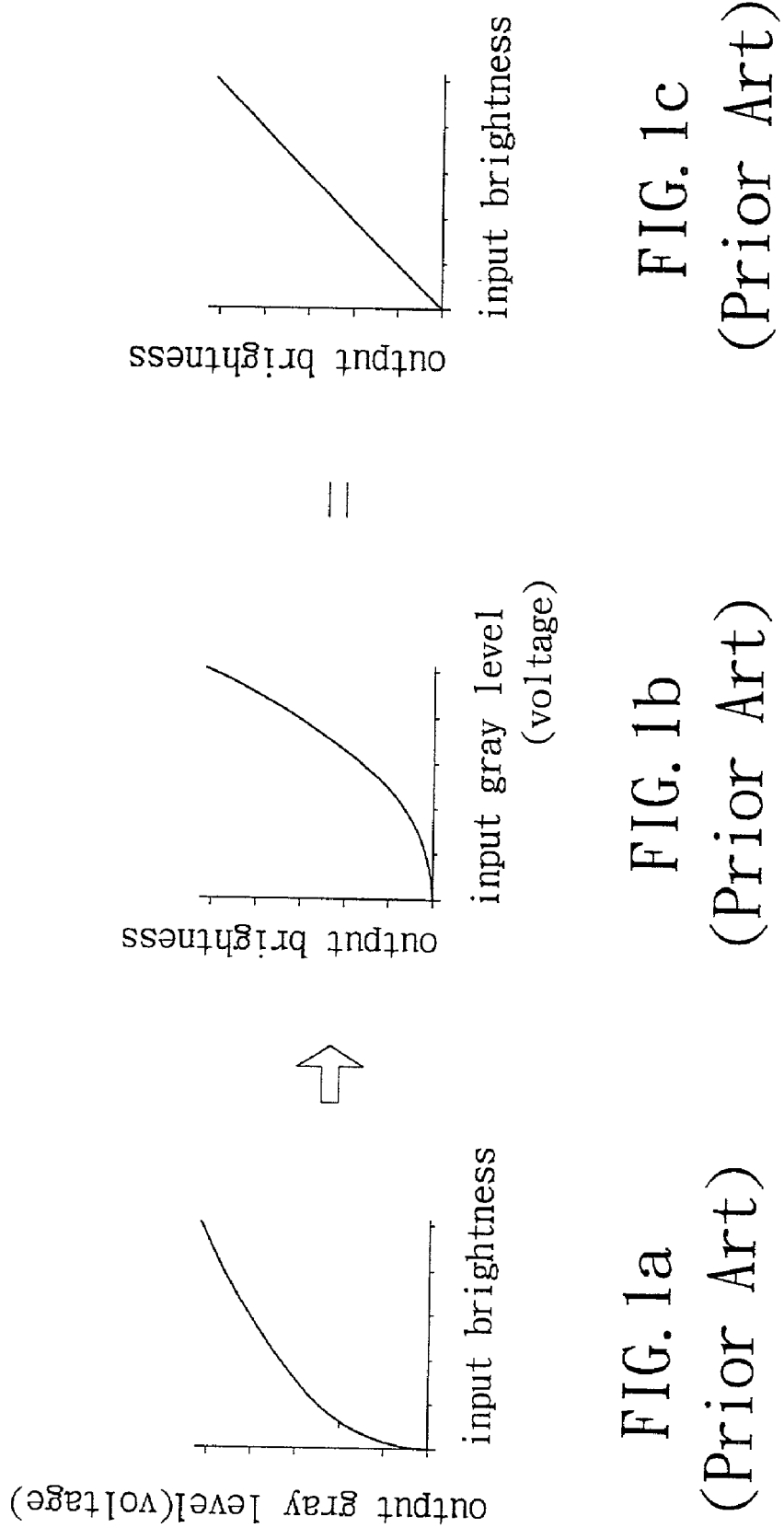
FIG. 1a is a graph showing a relationship of input brightness versus output gray level (voltage) of a conventional color TV.
FIG. 1b is a graph showing a relationship of input gray level (voltage) versus output brightness of the conventional color TV.
FIG. 1c is a graph showing a relationship of input brightness versus output brightness of the conventional color TV.
Figures 2A, 2B, 2C:
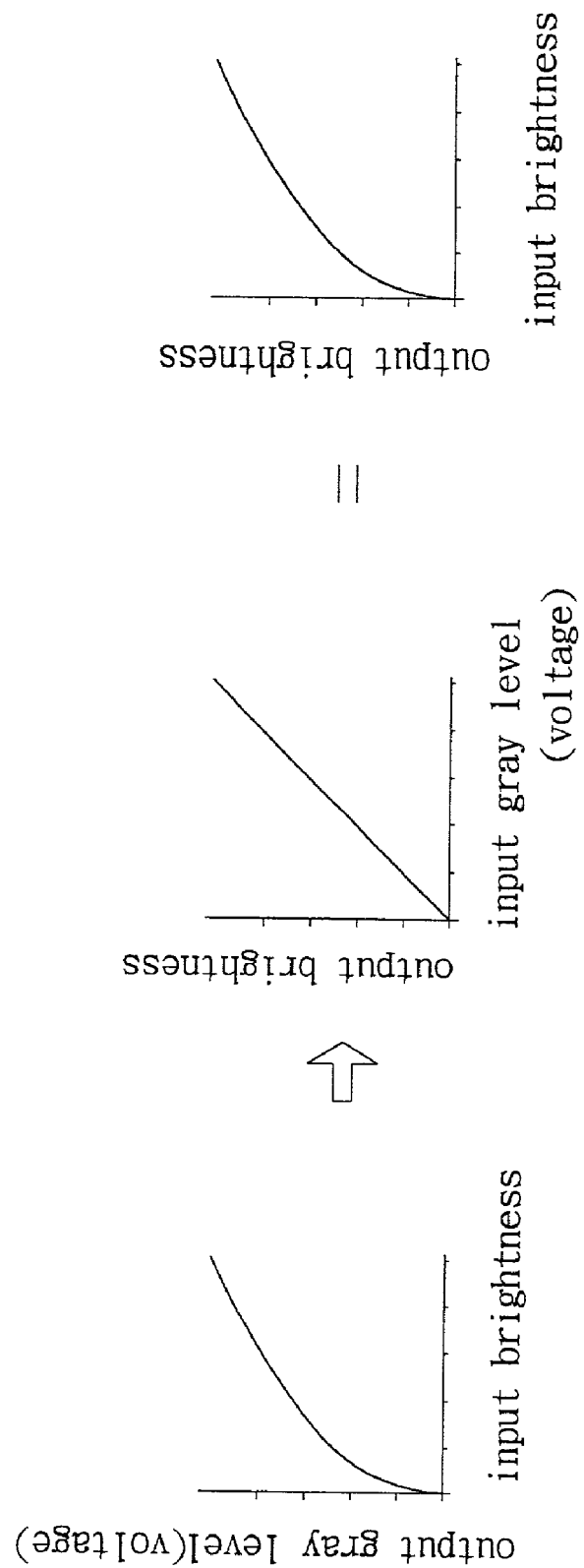
FIG. 2a is a graph showing a relationship of input brightness versus output gray level (voltage) of a conventional plasma display panel (PDP)
FIG. 2b is a graph showing a relationship of input gray level (voltage) versus output brightness of the conventional PDP.
FIG. 2c is a graph showing a relationship of input brightness versus output brightness of the conventional PDP.
Figures 3A, 3B, 3C, 3D:
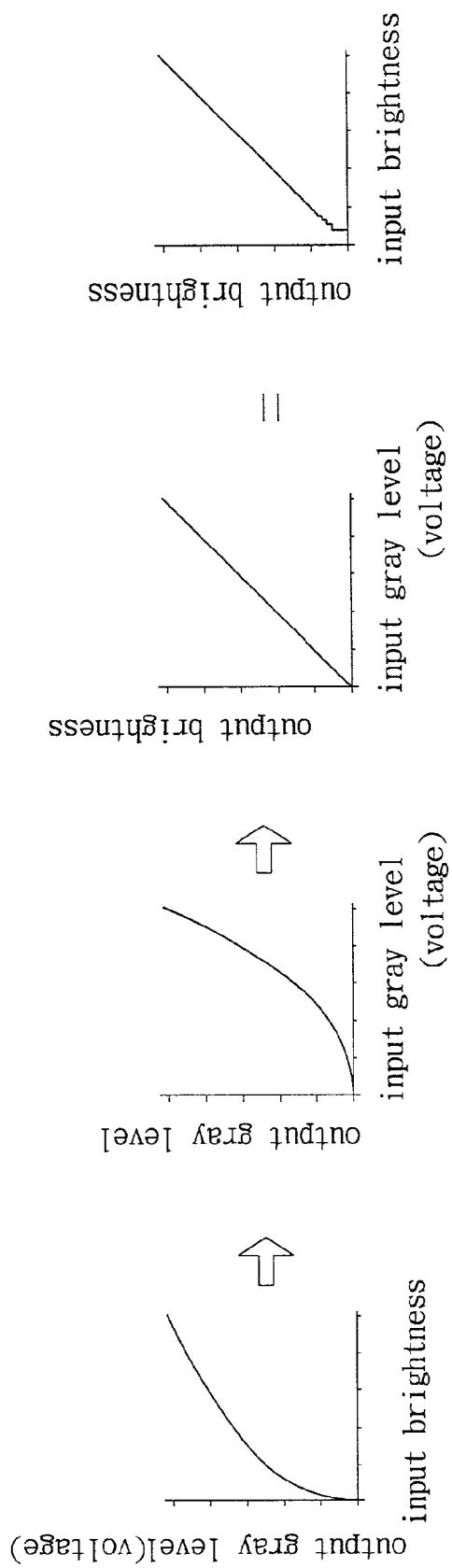
FIG. 3a is a graph showing a relationship of input brightness versus output gray level (voltage) of the conventional PDP after an anti compensation process is performed thereon.
FIG. 3b is a graph showing a relationship of input gray level (voltage) versus output gray level of the conventional PDP after the anti compensation process is performed thereon.
FIG. 3c is a graph showing a relationship of input gray level (voltage) versus output brightness of the conventional PDP after the anti compensation process is performed thereon.
FIG. 3d is a graph showing a relationship of input brightness versus output brightness of the conventional PDP after the anti compensation process is performed thereon.

Referring to FIGS. 4 to 7, where a method according to the invention is illustrated by respective graphs and a flowchart. Before the method performs an anti compensation process on a video signal received by the PDP, a compensation process (step 10) is performed on the video signal with respect to $\gamma=0.45$ in equation (1), a processing (step 11) is performed on the video signal for dividing it into at least two segments based on a gray level thereof. Then, in step 12, various anti compensation processes are performed on the video signal in respective segments so as to increase the number of gray levels of the video signal in the range of a first low gray level and increase a gray level (or brightness) gradient of the video signal in the range of a second high gray level. As a result, image quality the PDP is greatly improved. Further, a false contour is not easily incurred in the range of the low gray level. Consequently, a sharp contrast occurs in the range of the high gray level. As an end, a difference between two gray levels in the range of high gray level is distinguishable visually, resulting in an enhanced image brightness.

The gray level of an image shown on a typical color TV may be varied depending on input voltage by utilizing the physical characteristic of CRT of color TV. Further, gray level of an output image is related to that of an input video signal. Hence, an output gray level of a typical color TV may be expressed in following equation (3) by deriving itself from equation (1):

$$\text{output gray level} = C_1 \times (\text{input gray level}/C_1-1)^\gamma \quad (3)$$

where $C_1$ is a variable representing a maximum gray level of typical color TV. For example, the number of gray level thereof is 256, i.e., in the range of 0 to 255. Hence, gray level is 0 if input voltage is a minimum and gray level is 255 if input voltage is a maximum. As such, $C_1-1=$gray level of maximum gray level$=255$ and input gray level is a gray level of input video signal.

As stated above, a compensation process is performed on the video signal with respect to $\gamma=0.45$ in equation (1)). Thereafter, an anti compensation process is performed on the received video signal for obtaining an improved image brightness on PDP. As a result, brightness of an input image of PDP may be expressed in terms of an output gray level. Similarly, an output gray level of PDP may be expressed in following equation (4) by deriving itself from equation (1):

$$\text{output gray level} = C_2 \times (\text{input gray level}/C_2-1)^\gamma \quad (4)$$

where C2 is a variable representing a gray level of PDP. For example, the number of gray level thereof is 256, i.e., $C_2=256$ in the range of 0 to 255. Hence, a maximum gray level is 255, i.e., $C_2-1=255$. In following cases that a plurality of $\gamma$ having values smaller than 2.2 (e.g., 2.0, 1.8, and 1.6) are substituted into $\gamma$ in equation (4) for obtaining respective output gray level. It is found that the smaller the γ the higher the output gray level in the range of low gray level.

This may be best illustrated in Table II below.

TABLE II

| gray level of original video signal | gray level after γ = 2.2 conversion |
|---|---|
| 0–14 | 0 |
| 15–24 | 1 |
| 25–31 | 2 |
| 32–36 | 3 |
| 37–40 | 4 |
| 41–44 | 5 |
| 45–48 | 6 |
| 49–51 | 7 |
| 52–54 | 8 |
| 55–57 | 9 |
| 58–59 | 10 |
| ... | ... |
| 255 | 255 |
| Total gray level = 256 | Total gray level = 184 |

As to the higher gray level in the range of low gray level, it means that a false contour is not easily occurred. Further, gradient of PDP may be expressed in following equation (5) by differentiating equation (3):

$$\text{gradient} = C_1/255 \times \gamma \times (\text{input gray level}/C_1 - 1)^{\gamma-1} \quad (5)$$

Figure 4:
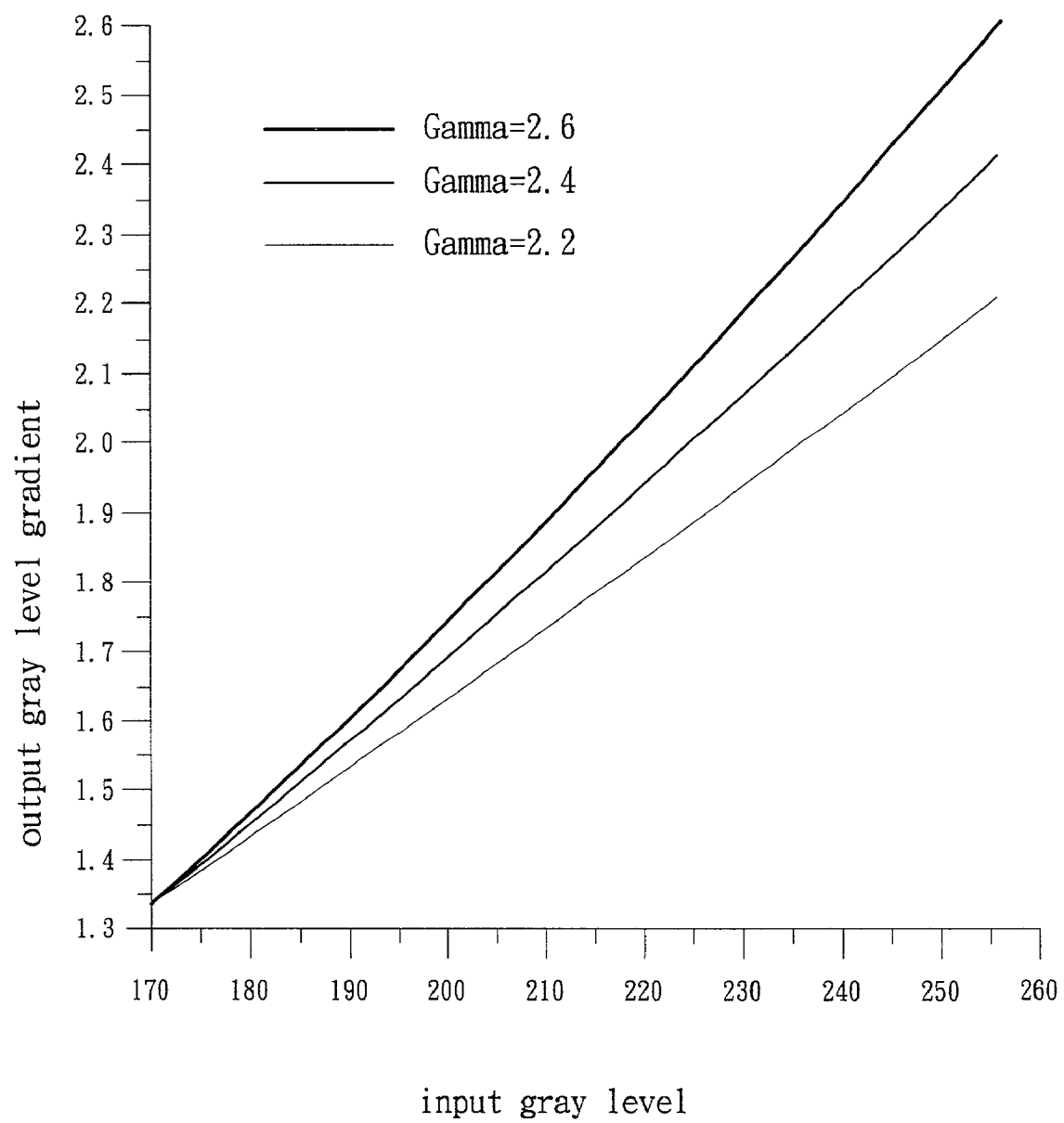
FIG. 4 is a graph showing a relationship of input gray level versus output gray level gradient after performing a method of effecting various anti compensation processes on a segmented gray level of input image on PDP according to the invention where three Gamma values are used.
Figure 5:
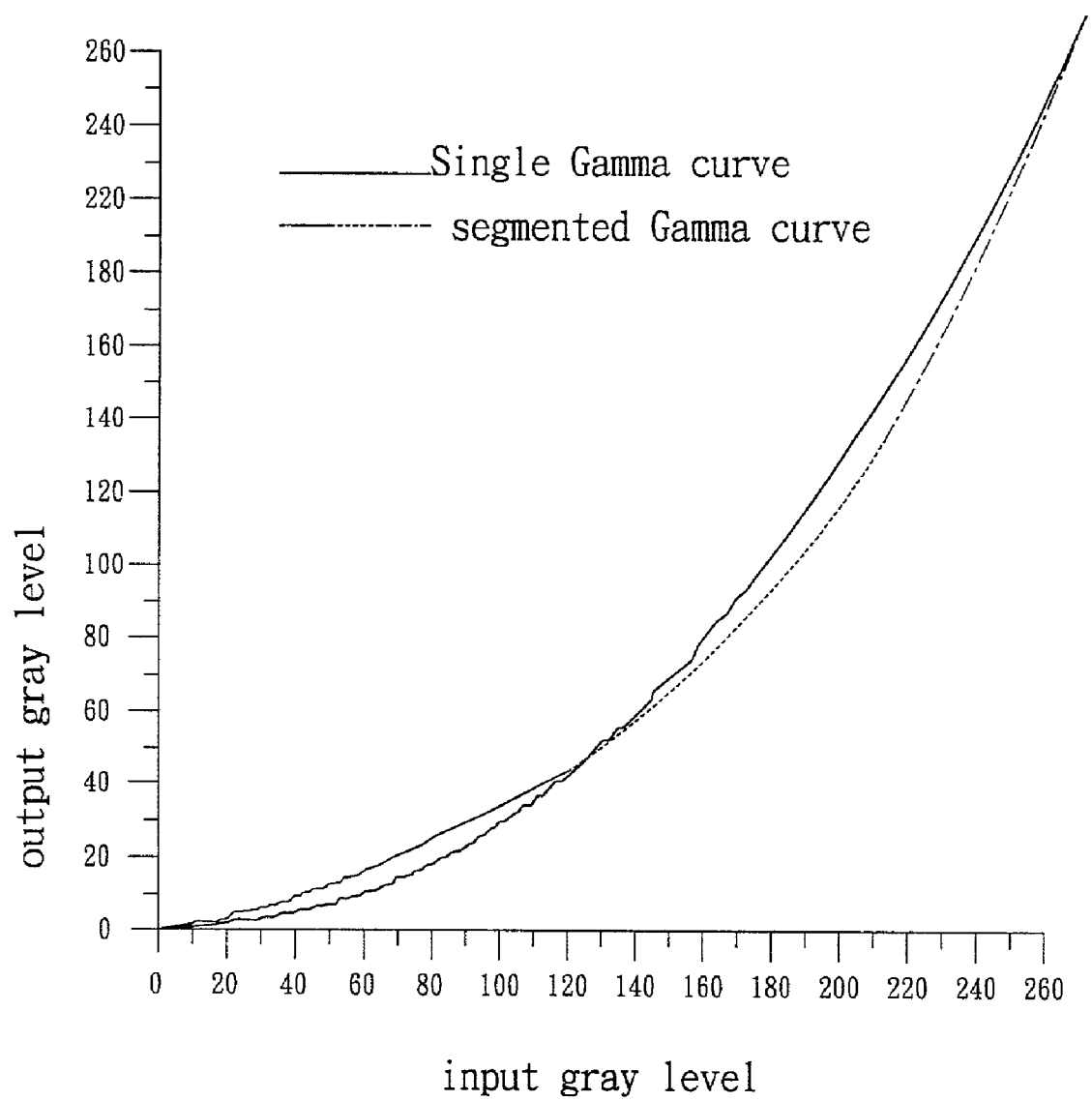
FIG. 5 is a graph similar to FIG. 4 showing a relationship of input gray level versus output gray level where single Gamma and segmented Gamma curves are plotted for comparison.
Figure 6:
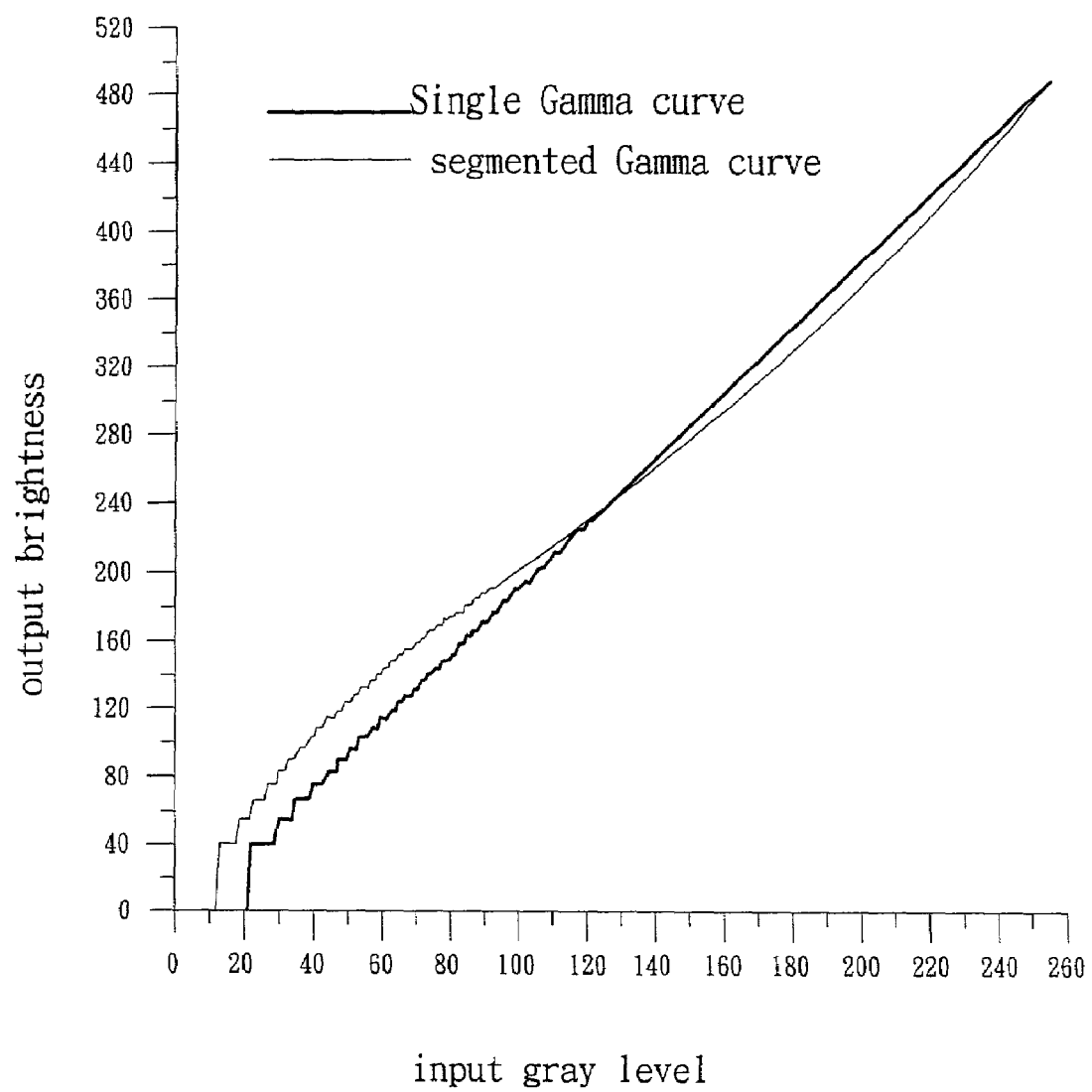
FIG. 6 is a graph similar to FIG. 4 showing a relationship of input gray level versus output brightness where single Gamma and segmented Gamma curves are plotted for comparison.
Figure 7:
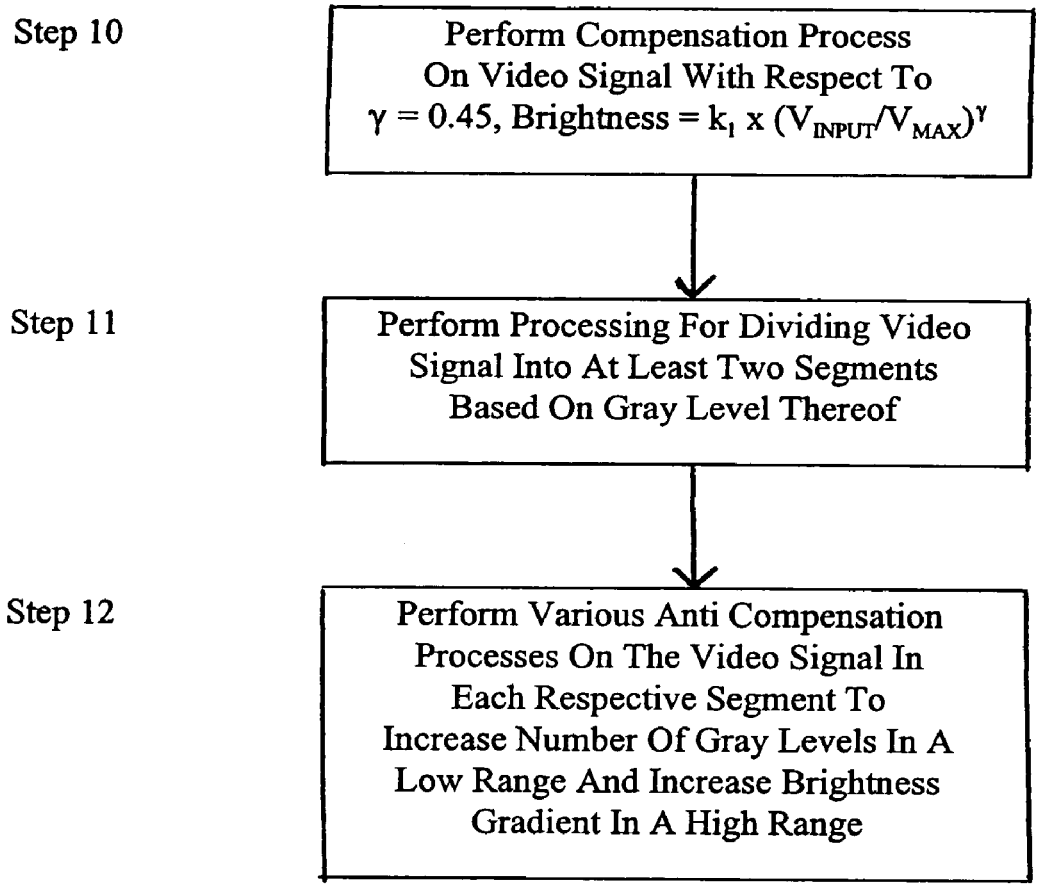
FIG. 7 is a flowchart showing an anti compensation method according to a preferred embodiment of the invention.

In view of equation (5), it is found that there is a substantially linear relationship between brightness of PDP and output gray level. Hence, the contrast of image becomes poorer as gradient of output image of PDP becomes smaller. In other words, the contrast of image becomes sharper as gradient of output image of PDP becomes larger. In following cases that a plurality of γs having values larger than 2.2 (e.g., 2.4 and 2.6) are substituted into γ in equation (5) for obtaining respective output gray level. It is found that the larger the γ the higher the output gray level in the range of high gray level (FIG. 4). This means that the contrast of image becomes sharper. That is, a gray level difference in the range of high gray level of output image is easier to distinguish visually.

Above fact is obtained and utilized by the invention in which before the method of the invention performs an anti compensation process on the video signal received by PDP, (i.e., a compensation process is performed on the video signal with respect to γ=0.45 in equation (1)), a processing is performed on the video signal for dividing it into at least two segments based on gray level thereof. Then a plurality of anti compensation processes are performed on the video signal in respective segment with respect to various γs. A smaller γ is used in the anti compensation process with respect to video signal in the range of low gray level for increasing the number of gray level therein. As a result, a false contour is not easily occurred in the range of low gray level. In contrast, a larger γ is used in the anti compensation process with respect to video signal in the range of high gray level for increasing the number of gray level therein. As a result, a sharp contrast of image is obtained, thereby greatly improving the image quality of PDP.

In one embodiment of the invention, a maximum brightness of a PDP is 500 cd/m² if gray level thereof is 256. Also, an anti compensation process on video signal received by PDP is already performed with respect to γ=0.45 in equation (1). Thus when video signal is received by PDP a control circuit of PDP will be enabled to divide video signal into three segments based on gray level thereof. Then a plurality of anti compensation processes are performed on the video signal in respective segment with respect to various γs. A γ smaller than 2.2 (e.g., γ=1.6) is used in the anti compensation process with respect to video signal in the range of low gray level for increasing the number of gray level therein. Similarly, a γ=2.2 is used in the anti compensation process with respect to video signal in the range of intermediate gray level. A γ larger than 2.2 (e.g., γ=2.6) is used in the anti compensation process with respect to video signal in the range of high gray level. After the invention performing above anti compensation processes, as to output image of PDP, the number of gray level in the range of low gray level is increased and gradient in the range of high gray level is also increased. As a result, a false contour is not easily occurred in the range of low gray level. Further, a sharp contrast of output image is obtained in the range of high gray level, thereby greatly improving the image quality of PDP.

While the invention has been described by means of specific embodiments, numerous modifications and variations could be made thereto by those skilled in the art without departing from the scope and spirit of the invention set forth in the claims.

What is claimed is:

1. A process of effecting various anti compensation processes on input image on a plasma display panel, said process comprising the steps of:
   performing a gamma compensation process on a video signal received by said PDP with respect to a first gamma;
   dividing said video signal into at least two segments based on a gray level thereof; and
   performing a variety of anti compensation processes on said video signal in at least one of said segments, after performing the gamma comnensation process,
   wherein a second gamma smaller than said first gamma is used in said anti compensation process with respect to said video signal in a range of a first gray level.

2. The process of claim 1, wherein in the step of performing the variety of anti compensation processes, each respective one of said segments is performed.

3. The process of claim 1, wherein a third gamma larger than said first gamma is used in said anti compensation process with respect to said video signal in a range of a second gray level, wherein said second gray level is higher than said first gray level.

4. The process of claim 3, wherein said gamma compensation process has been performed on said video signal received by said PDP in a following equation:

$$\text{brightness} = k_1 \times (V_{INPUT}/V_{MAX})^\gamma$$

where γ=2.2, $k_1$ is a variable representing a gray level of a color television (TV), $V_{INPUT}$ is an input voltage, and $V_{MAX}$ is a maximum voltage for showing said maximum gray level of said color TV.

5. The process of claim 4, wherein a fourth gamma smaller than 2.2 is used in said anti compensation process with respect to said video signal in said range of said first gray level.

6. The process of claim 4, wherein a fifth gamma equal to 2.2 is used in said anti compensation process with respect to said video signal in said range of a third gray level between said first and second gray level.

7. The process of claim 4, wherein a sixth gamma larger than 2.2 is used in said anti compensation process with respect to said video signal in said range of said second gray level.

* * * * *